United States Patent
Zhang et al.

(10) Patent No.: US 9,483,812 B2
(45) Date of Patent: Nov. 1, 2016

(54) ENHANCING MOTION PICTURES WITH ACCURATE MOTION INFORMATION

(71) Applicant: IMAX Corporation, Mississauga (CA)

(72) Inventors: Ning Zhang, Oakville (CA); Samuel Ziheng Zhou, Mississauga (CA)

(73) Assignee: IMAX Corporation, Missisauga, CA (US)

( * ) Notice: Subject to any disclaimer, the term of this patent is extended or adjusted under 35 U.S.C. 154(b) by 0 days.

(21) Appl. No.: 14/779,471

(22) PCT Filed: Mar. 25, 2014

(86) PCT No.: PCT/IB2014/060139
§ 371 (c)(1),
(2) Date: Sep. 23, 2015

(87) PCT Pub. No.: WO2014/155290
PCT Pub. Date: Oct. 2, 2014

(65) Prior Publication Data
US 2016/0048951 A1 Feb. 18, 2016

Related U.S. Application Data

(60) Provisional application No. 61/804,814, filed on Mar. 25, 2013.

(51) Int. Cl.
*G06T 5/00* (2006.01)
*H04N 19/597* (2014.01)
(Continued)

(52) U.S. Cl.
CPC .......... *G06T 5/002* (2013.01); *G06T 3/4053* (2013.01); *G06T 7/0026* (2013.01); *G06T 7/206* (2013.01); *G06T 7/2033* (2013.01); *G06T 7/2086* (2013.01); *H04N 19/30* (2014.11);
(Continued)

(58) Field of Classification Search
CPC ... G06T 5/002; G06T 7/0026; G06T 7/2033; G06T 7/206; G06T 7/2086; H04N 19/30; H04N 19/54; H04N 19/635; H04N 19/85; H04N 19/597; H04N 19/51; H04N 19/08
See application file for complete search history.

(56) References Cited

U.S. PATENT DOCUMENTS 5,526,053 A * 6/1996 Dorricott ............... H04N 7/014 348/443
5,600,731 A * 2/1997 Sezan ....................... G06T 7/20 348/620

(Continued)

OTHER PUBLICATIONS

International Patent Application No. PCT/IB2014/060139, "International Search Report and Written Opinion" mailed Jul. 9, 2014, 11 pages.

(Continued)

*Primary Examiner* — Jingge Wu
(74) *Attorney, Agent, or Firm* — Kilpatrick Townsend & Stockton LLP (57) ABSTRACT

Methods and systems for digitally enhancing the characteristics of an image sequence including video and motion picture images are provided. Highly accurate motion information represented by trajectories are generated through analyzing available image frames in the image sequence. Some embodiments of the present invention relate to generating multiple layer trajectories from an image sequence. Certain aspects may be applicable to the enhancement of three-dimensional (3D) image sequences including 3D video and 3D motion pictures.

34 Claims, 5 Drawing Sheets

(51) Int. Cl.
*H04N 19/30* (2014.01)
*H04N 19/54* (2014.01)
*H04N 19/85* (2014.01)
*H04N 19/635* (2014.01)
*G06T 3/40* (2006.01)
*G06T 7/00* (2006.01)
*G06T 7/20* (2006.01)
*H04N 19/187* (2014.01)

(52) U.S. Cl.
CPC ........... *H04N 19/54* (2014.11); *H04N 19/597* (2014.11); *H04N 19/635* (2014.11); *H04N 19/85* (2014.11); *G06T 2207/10016* (2013.01); *G06T 2207/20024* (2013.01); *G06T 2207/20064* (2013.01); *G06T 2207/20182* (2013.01); *H04N 19/187* (2014.11)

(56) References Cited

U.S. PATENT DOCUMENTS

| | | | | |
|---|---|---|---|---|
| 5,647,049 | A * | 7/1997 | Odaka | H04N 19/105 375/240.15 |
| 6,263,089 | B1 * | 7/2001 | Otsuka | G06T 7/60 382/107 |
| 6,643,387 | B1 * | 11/2003 | Sethuraman | G06F 17/30811 348/699 |
| 7,092,547 | B2 * | 8/2006 | Masukura | G06T 7/20 382/103 |
| 8,279,341 | B1 | 10/2012 | Bozinovic | |
| 2005/0259739 | A1 * | 11/2005 | Nakamura | G06T 3/4007 375/240.16 |
| 2005/0271144 | A1 * | 12/2005 | Yoshiwara | G06T 3/4007 375/240.16 |
| 2009/0136146 | A1 * | 5/2009 | Kaino | H04N 19/51 382/236 |
| 2013/0016784 | A1 | 1/2013 | Sikora et al. | |
| 2013/0148872 | A1 * | 6/2013 | Aisaka | A61B 3/12 382/128 |
| 2013/0170551 | A1 * | 7/2013 | Liu | H04N 7/014 375/240.16 |
| 2013/0259316 | A1 | 10/2013 | Desimone et al. | |
| 2014/0219356 | A1 * | 8/2014 | Nishitani | H04N 19/00733 375/240.16 |

OTHER PUBLICATIONS

Lang et al., "Practical Temporal Consistency for Image-Based Graphics Applications", ACM Trans. Graph. 31.4, 2012, 10 pages.

Sand et al., "Particle Video: Long-Range Motion Estimation Using Point Trajectories", International Journal of Computer Vision, 80.1, 2008, 8 pages.

Dubois et al., Estimation of 2-D Motion Fields from Image Sequences with Application to Motion-Compensated Processing, Motion Analysis and Image Sequence Processing, vol. 220 of the series, Jan. 1, 1993, pp. 1-35.

European Application No. 14773169.9, Extended European Search Report mailed on Aug. 23, 2016, 10 pages.

Haseyama et al., Spatio-temporal resolution enhancement of video sequence based on super-resolution reconstruction, IEEE International Conference on Acoustics Speech and Signal Processing, Mar. 14, 2010, pp. 870-873.

Werlberger et al., Optical Flow Guided TV-L1 Video Interpolation and Restoration, Energy Minimization Methods in Computer Vision and Pattern Recognition, vol. 6819 of the series, Jul. 25, 2011, pp. 273-286.

\* cited by examiner

Trajectory with M=3 features

| Trajectory intersections | Trajectory Feature 1 $f^1$ | Trajectory Feature 2 $f^2$ | Trajectory Feature 3 $f^3$ |
|---|---|---|---|
| $(x_0, y_0, t_0)$ | 1 | 1 | 0 |
| $(x_1, y_1, t_1)$ | 1 | 0 | 0 |
| $(x_2, y_2, t_2)$ | 1 | 1 | 0 |
| $(x_3, y_3, t_3)$ | 1 | 0 | 0 |
| $(x_4, y_4, t_4)$ | 1 | 1 | 0 |

ENHANCING MOTION PICTURES WITH ACCURATE MOTION INFORMATION

CROSS-REFERENCE TO RELATED APPLICATIONS

This claims priority to U.S. Provisional Application Ser. No. 61/804,814, titled "Methods and Systems for Enhancing Motion Pictures with Accurate Motion Information," and filed Mar. 25, 2013, the entirety of which is incorporated herein by reference.

TECHNICAL FIELD

This disclosure relates generally to the field of digitally enhancing the characteristics of image content and, more particularly, the characteristics of video and motion picture content for improved visual display quality.

BACKGROUND

For real-world images, particularly in videos and motion pictures, certain image content may appear dissimilar in different image frames due to many complex factors, such as the presence of noise, lighting change, lens-focus change, object motion, object rotation, occlusion, etc. As a result, an image enhancement method that is based on tracking similar appearances of image content over multiple image frames, such as a conventional motion tracking algorithm, may not be able to follow the motion of an image content accurately and, in some cases, may even fail to recognize the image content in some image frames due to different appearances.

SUMMARY

In one example, a method for enhancing an image sequence is provided. The image sequence is received with image frames. A decomposition feature is determined for the image frames. Feature connections are computed for image pixels based on the decomposition feature. At least one anchor trajectory is calculated based on at least one selected feature connection among the feature connections. A relationship of the image pixel with the at least one anchor trajectory is determined. A new trajectory is created for an image pixel of the decomposed image frames based on the at least one anchor trajectory and the relationship of the image pixel with the at least one anchor trajectory. At least one trajectory feature is defined for the new trajectory and whether the at least one trajectory feature needs to be modified at a new trajectory intersection is determined. The new trajectory intersection is refined and a final trajectory is produced. An enhanced image pixel is created by modifying a pixel image feature based on the final trajectory. An enhanced image sequence is created based on the enhanced image pixel. The enhanced image sequence is outputted.

In another example, a method for enhancing an image sequence is provided. The image sequence with image frames is received. The image sequence is decomposed into at least two layers that form decomposed image frames. A decomposition feature is determined for the image frames in a layer. Feature connections are computed for image pixels in the layer based on the decomposition feature. At least one anchor trajectory is calculated for the layer based on at least one selected feature connection. A relationship of an image pixel of the image frames with the at least one anchor trajectory in each of the at least two layers is determined. A new trajectory is created for the image pixel of the decomposed image frames based on the at least one anchor trajectory and the relationship of the image pixel with the at least one anchor trajectory from the at least two layers. At least one trajectory feature is defined for the new trajectory in the layer and whether the at least one trajectory feature needs to be modified at a new trajectory intersection in the layer is determined. The new trajectory intersection is refined and a final trajectory is produced. An enhanced image pixel in at least one layer is created by modifying image pixel features in each of the at least two layers based on the final trajectory. An enhanced image sequence is created based on the enhanced image pixel in decomposed image layers. The enhanced image sequence is outputted.

In another example, a method is provided that includes generating at least one image processing layer from image frames of an image sequence. Decomposition features are determined that are characteristics of image content in the at least one image processing layer for the image frames. Feature connections are determined based on the decomposition features. The feature connections include links that connect image pixels in the at least one image processing layer among space-time locations. Anchor trajectories are calculated for the at least one image processing layer based on the feature connections. The anchor trajectory represent space-time locations of selected image content elements over a length of the image sequence. Relationships are determined of the image pixels with the anchor trajectories. New trajectories for the image pixels are generated based on the relationships and the anchor trajectories. A trajectory feature is defined for the new trajectories and a modification level is determined for the trajectory feature at new trajectory intersections in the at least one image processing layer. The trajectory feature representing characteristics selected for targeted enhancement in the image sequence. The new trajectory intersections recording intersections of the new trajectories with the image frames in a form of space-time locations. Final trajectories are generated from the new trajectories. At least one enhanced image layer is generated by modifying pixel image features in the at least one image processing layer based on the final trajectories. An enhanced image sequence is generated using the at least one enhanced image layer.

In another example, a non-transitory computer-readable medium is provided having instructions stored thereon that are executable by a processor device to perform operations, the operations comprising:

generating at least one image processing layer from image frames of an image sequence;

determining decomposition features that are characteristics of image content in the at least one image processing layer for the image frames;

determining feature connections based on the decomposition features, the feature connections including links that connect image pixels in the at least one image processing layer among space-time locations;

calculating anchor trajectories for the at least one image processing layer based on the feature connections, the anchor trajectories representing space-time locations of selected image content elements over a length of the image sequence;

determining relationships of the image pixels with the anchor trajectories;

generating new trajectories for the image pixels based on the relationships and the anchor trajectories;

defining a trajectory feature for the new trajectories and determining a modification level for the trajectory feature at new trajectory intersections in the at least one image processing layer, the trajectory feature representing characteristics selected for targeted enhancement in the image sequence, the new trajectory intersections recording intersections of the new trajectories with the image frames in a form of space-time locations;

generating final trajectories from the new trajectories;

generating at least one enhanced image layer by modifying pixel image features in the at least one image processing layer based on the final trajectories; and generating an enhanced image sequence using the at least one enhanced image layer

These illustrative examples are mentioned not to limit or define the disclosure, but to aid understanding thereof. Additional examples, features, and embodiments are discussed in the Detailed Description, and further description is provided there. Advantages offered by one or more of the various examples may be further understood by examining this specification or by practicing one or more examples presented.

DETAILED DESCRIPTION

Certain aspects and features of the present disclosure relate to enhancing a characteristic or characteristics of an image sequence by computing trajectories across multiple image frames of the image sequence and optimizing the performance of the enhancement along the trajectories. The characteristics of an image sequence, including video and motion picture images, can be digitally enhanced by analyzing available image frames in the image sequence and generating accurate motion information. Accurate motion information can be obtained by computing trajectories for each image pixel of each image frame of the image sequence. The structure of the trajectory can allow an image enhancement method to achieve a superior performance by following the trajectories that represent more accurate motion and to perform based on similar appearances of the image content and on dissimilar appearances of the image content.

An image frame can include multiple image pixels, and each pixel can define an image content element at a space-time location in the image frame. Because motion can exist in an image sequence, the same content element may appear in different space-time locations in other image frames of the image sequence. The movement of the image content element may be represented by a path connection that records the space-time locations of the same image content element across multiple image frames of the image sequence. Trajectories can include the space-time locations of an image content element over the length of the image sequence, and the features of the image content element in the vicinity of each space-time location in a form of multiple feature channels.

A trajectory of an image content element can include three types of elements: a trajectory intersection, a trajectory feature and a trajectory feature flag. A trajectory intersection can record the intersection of a trajectory with an image frame, and the trajectory intersection can be represented as a space-time location, such as as $(x_n, y_n, t_n)$ for image frame n. A trajectory can begin at a pixel location in a frame, which can be an anchor pixel of the trajectory, and the trajectory can intersect with other image frames at space-time locations that are either pixel positions or sub-pixel positions.

In one example, a trajectory has a structure that contains trajectory intersections, trajectory features, and trajectory feature flags. A trajectory intersection can record the intersection of a trajectory with an image frame in a form of a space-time location. A trajectory feature represents certain characteristics of the image sequence that is selected for a targeted enhancement application. Examples of a targeted enhancement application include super-resolution, de-noising, and de-occlusion. Because different trajectory features may be selected for different targeted enhancement applications, trajectories may be customized for a targeted enhancement application. For a given targeted enhancement application, a trajectory feature may be considered trustworthy in some image frames but unreliable in other image frames. The changing status of a trajectory feature can be tracked by a trajectory feature flag, which marks the trajectory feature as an essential image component or as an outlying image component in different image frames. An essential image component represents a "good" space-time location where the trajectory feature can be used to compute a targeted enhancement or to predict or refine trajectories. An outlying image component represents a "bad" space-time location where the trajectory feature may be harmful to related computations. Essential image components are used for computations that are based on similarity, while outlying image components are used for dissimilarity. Trajectories may be computed for any image sequence.

In one example, each image frame of an image sequence can be decomposed into multiple component layers and trajectories may be computed in each layer. Layer decomposition can be based on pixel image features that are identified for enhancement based on the targeted enhancement application. Pixel image features may be extracted from the image sequence, and then organized or grouped into layers. Since the pixel image features are selected for the purpose of enhancement, the pixel image features may appear dissimilar in some image frames in certain layers and may be difficult to track reliably and accurately. Decomposition features can be identified for each layer to facilitate the tracking of pixel image features within the layer. A decomposition feature can be different from a pixel image feature, and the decomposition feature can be prominent within the layer and easier to track. A layer with additional decomposition feature channels can be an augmented layer in which each image pixel is assigned an additional value from each feature channel. Trajectories may be computed in each layer, and the trajectory features may be selected from the feature channels in the augmented layer.

In one example, anchor trajectories are computed in each layer for selected image pixels. The feature connections for those pixels in a layer can be computed based on decomposition feature channels, and anchor trajectories can be computed from the feature connections using a sub-space method. The anchor trajectories can be used for computing trajectories for all or substantially all pixels in all or multiple layers.

In one example, trajectories for each pixel in each layer are computed based on the anchor trajectories. Relationships between a pixel and the anchor trajectories in each layer can be computed, and new trajectories for each pixel may be computed based on the iterative refinement of trajectory intersections. Once trajectories are established, for pixels of the image frames, the appearance of the image content at a pixel can be optimized along the trajectories to generate an enhanced appearance. Certain aspects provide the ability of tracking dissimilar appearances along a trajectory in order to produce a preferred appearance.

In one example, the appearance of image content may be adjusted to meet different quality criteria from different targeted applications, including motion picture theatrical presentations, television broadcasting, video streaming through internet, video up-conversion, and VFX (visual effects) applications. The appearance of the image content can be produced by an optimization process along the trajectory based on the selected criteria.

In one example, a trajectory can be generalized for stereoscopic three-dimensional (3D) motion pictures and 3D videos that include a left-eye image sequence and a right-eye image sequence. Correlations between the left-eye image sequence and the right eye sequence can be identified, and trajectories can be computed in each sequence. The trajectories of both image sequences can be unified so that the trajectories represent the same image content. A joint optimization can be applied to optimize the appearance of the image content along trajectories.

Every pixel of an image frame may have a trajectory across multiple image frames of the image sequence. The trajectory features can be represented by M channels, $f^1$, $f^2, \ldots, f^M$. For example, given an image sequence that includes N image frames, and each image frame has a spatial resolution of W pixels per row and H rows, a pixel P in image frame n is a spot that has a trajectory $T(P)$ represented by:

(Equation 1)
$$T(p) = \left\{ \begin{array}{l} (x_1, y_1, t_1, f_1^1, f_1^2, \ldots f_1^M), (x_2, y_2, t_n, f_2^1, f_2^2, \ldots f_2^M), \ldots, \\ (x_n, y_n, t_n, f_n^1, f_n^2, \ldots f_n^M), \ldots, (x_N, y_N, t_N, f_N^1, f_N^2, \ldots f_N^M) \end{array} \right\}$$

The trajectory $T(P)$ has N entries, with each entry corresponding to one of the image frames of the image sequence. Each entry of $T(P)$ corresponds to an image frame, and each entry has M+3 elements: $(x_1, y_1, t_1, f_1^1, f_1^2, \ldots f_1^M)$, $(1 \leq t \leq N)$. The frame number $1 \leq t \leq N$ represents the frame position in the image sequence. Trajectory $T(P)$ has an anchor position in image frame n at which space-time locations $(x_N, y_N, t_N)$ of the trajectory can be represented by integers. The intersections of $T(P)$ in other frames $(x_1, y_1, t_1)$, with $t \approx n$, may be represented with sub-pixel precision. A trajectory may be defined for the entire length of the image sequence or only a portion of the image sequence.

The trajectory $T(P)$ may have multiple features $f^1_P$, $f^2_P, \ldots, f^M_P$, and each feature represents a specific characteristic of the trajectory at space-time location. The value of a feature in each image frame is recorded with an appropriate flag. The value of a feature flag may change over the length of the trajectory, indicating changes of computing strategy. In one example, each flag takes a value of "1" or "0". A flag value "1" of a feature can be the essential image component of the feature, and a value of "0" can be the outlying image component of the feature. The flag values of the features of a trajectory can control the change of computing strategies for the trajectory.

Essential image components can represent "strong" space-time locations along a trajectory that is trustworthy to be used for computing and predicting other trajectories or for refining the current trajectory. Outlying image components represent "weak" space-time locations along the trajectory that may be harmful to trajectory calculation. Essential image components can be used for computations that are based on similarity, while outlying image components can be used for computations that allow dissimilarity. During computing, essential image components can contribute to a data cost term. The outlying image components may be ignored in some cases or may be manipulated along a trajectory as long as the trajectory is computed based on the essential image components.

Figure 1:
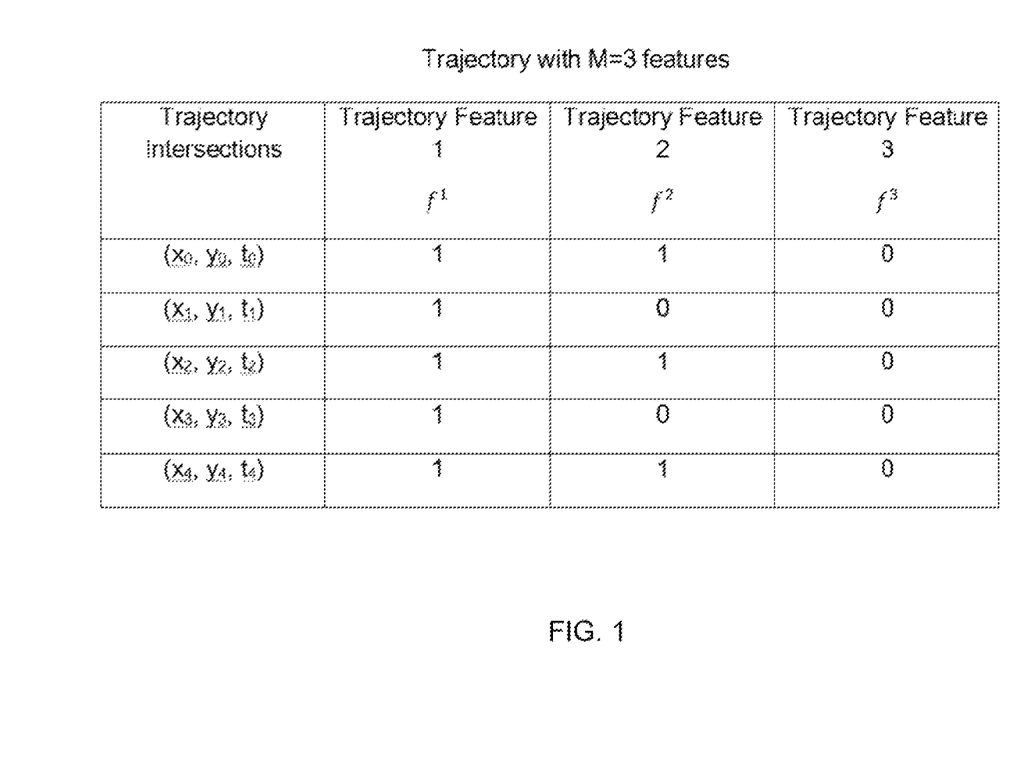
FIG. 1 is a table that includes examples of information recorded by an a trajectory according to one example.

In FIG. 1 there is shown a table that includes examples of information recorded by an a trajectory that has M=3 features.

The trajectory example shown in FIG. 1 can connect five space-time locations in five image frames, and the space-time locations can be trajectory intersections, denoted by $\{(x_0, y_0, t_0), (x_1, y_1, t_1), (x_2, y_2, t_2), (x_3, y_3, t_3), (x_4, y_4, t_4)\}$, where $x_n$, $y_n$ represent the spatial coordinates and $t_n$ represents the temporal coordinate. The trajectory has three trajectory features. Feature $f^1$ may represent large-scale image details. Feature $f^2$ may represent fine image details, and feature $f^3$ represent a lighting change between neighboring image frames. The trajectory in the example also has a feature flag array denoted by $\{(1,1,1,1,1), (1,0,1,0,1), (0,0,0,0,0)\}$. The feature flag array represents the characteristics of the image content at each trajectory intersection along the trajectory. For example, all "zero" flags for feature three indicates that the image pixels along the trajectory are not subject to lighting changes; all "one" flags for feature one indicates that the image pixels along the trajectory share similar large scale details. The mixture of "zero" and "one" flags of feature two indicates that the fine-scale detail of the image pixels at certain space-time locations may be significantly modified.

The trajectory may be defined using two computation methods. In the first case, all trajectory features are flagged with "one"s, indicating that the trajectory is trustworthy and the information collected along the trajectory includes essential image components that can be used in computing. An example of such methods may include a block-based, motion-compensated algorithm in which pixels in the vicinity of a trajectory are used for image enhancement. In the second case, trajectory features are flagged with "zero"s, indicating that the information collected along the trajectory cannot be used automatically for computations. An example of such methods includes human-assisted VFX operations in which image pixels may be replaced with new content based on human judgment.

Figure 2:
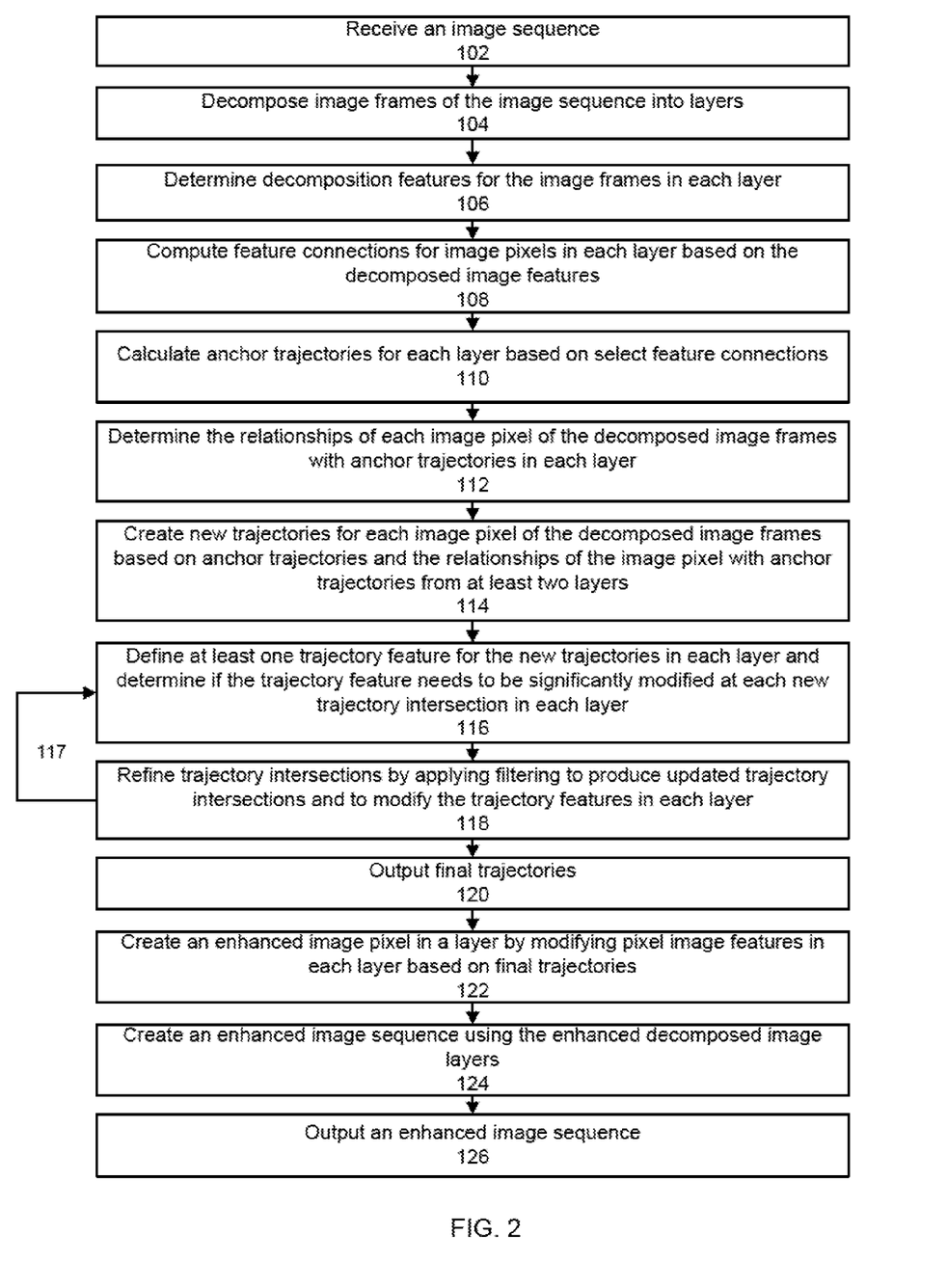
FIG. 2 is a block diagram of a method of enhancing an image sequence by computing multi-layer trajectories according to one example.

Trajectories may be computed in layers after an image sequence is decomposed into two or more layers. An image layer can be a collection of deconstructed image frames that describe a certain characteristic of the image sequence. FIG. 2 is a block diagram of an example of a process for enhancing an image sequence. An image sequence that that multiple image frames is received by an image processing device in block 102. The image processing device can perform the computations for the enhancement of certain targeted characteristics of the image sequence. Examples of targeted enhancement applications include fine-detail enhancement, noise reduction, image sharpening, and upsizing.

In block 104, the image frames of the image sequence are decomposed into layers by the image processing device. Each image frame of the image sequence can be first decomposed into at least two layers. The layer decomposition can be performed using a decomposition method that is selected based on the targeted enhancement application. For example, a wavelet transform may be used for the decomposition of an image sequence when the target is to enhance the fine details of the image sequence. Different decomposition methods may be selected for different targeted enhancement applications. An inverse transform can be available for a selected decomposition method so that each image frame of the image sequence can be recovered from the decomposed layers.

Figure 3:
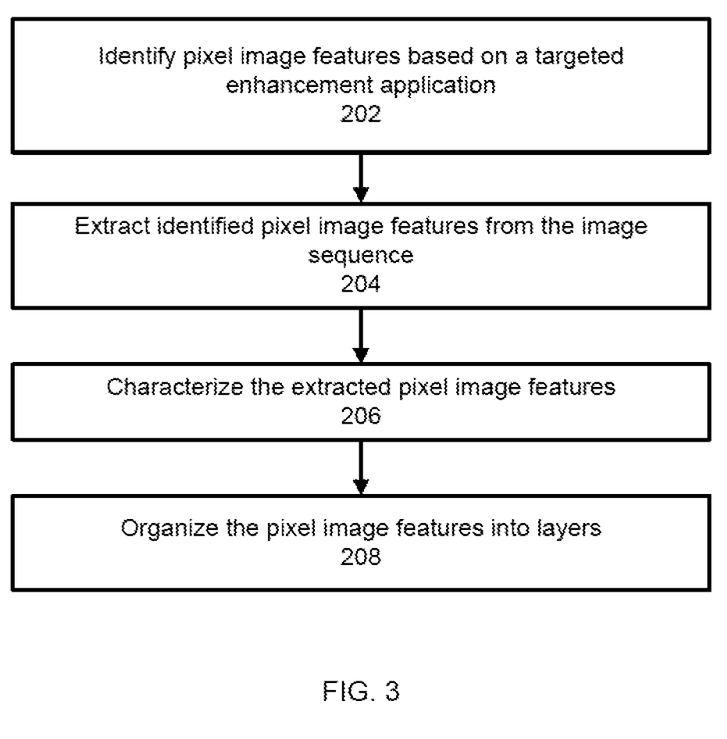
FIG. 3 is a block diagram of a method of decomposition of an image frame into layers according to one example.

Multiple layers of an image sequence can be generated by organizing or grouping pixel image features that are extracted from decomposition. FIG. 3 depicts an example of a process for performing layer decomposition of image frames in the image sequence into multiple layers. In block 202, pixel image features are identified based on a targeted enhancement application by the image processing device. Given a targeted enhancement application, a certain pixel image features of interest can be identified. A pixel image feature can represent a specific characteristic of image pixels that has a direct impact on the targeted enhancement over the image sequence. Examples of pixel image features include color, detail, contrast, and noise level. In the case that the targeted enhancement is super-resolution, image detail may be identified as a pixel image feature. Multiple pixel image features may be identified to be jointly enhanced for a given targeted enhancement application. For example, image detail and noise level may be identified when the targeted enhancement application is to increase the perceived resolution and to reduce noise.

In block 204, the image processing device extracts identified pixel image features from the image sequence. In the case that image detail is the identified pixel image feature, a wavelet transform may be applied to each image frame of the image sequence. The wavelet transform can separate fine details of an image frame in the image sequence into multiple scales and various spatial directions. Each image frame may be decomposed into four sub-bands, namely the HH, HL, LH and LL sub-bands. The HH, HL and LH sub-bands contain fine image detail at a first scale, and the LL sub-band can further be decomposed into another set of HH, HL, LH and LL sub-bands at a coarse scale. This process may be repeated to generate fine image detail at increasingly finer scales.

In block 206, the image processing device characterizes the extracted pixel image features. The extracted pixel image features may be further characterized to be organized into layers. In the case of wavelet sub-bands, the image details may be characterized by scales or by spatial orientations. Characterizing can include determining a mathematical description and organization of a particular feature detail of an image pixel, a layer, or a trajectory, etc. Examples of a feature detail include color, illumination intensity, lighting changes, motion, etc. In block 208, the image processing device organizes the pixel image features into multiple layers. Each layer can include a deconstructed image sequence that contains one or more channels. The formation of layers can be used in computing high-quality trajectories because multiple layers can jointly provide information for determining "strong" and "weak" space-time locations. The correlations between different layers can also provide useful information.

As an example, the pixel image features separated through wavelet transform may be grouped into three layers. Layer one can represent large-scale image details, and it may be generated by grouping HH, HL and LH sub-bands at a certain range of large scales. The large-scale image details in Layer one are not classified by spatial orientations. As a result, Layer one is a bandpass-filtered image sequence with only large scale details. Layer two can represent fine-scale image details, and it may be generated by selecting the HL, LH and HH sub-bands at a certain range of finer scales. The resulting Layer two image sequence can be a high-pass filtered image sequence. Layer three can represent brightness distribution, and it may use only the highest scale LL band. As a result, Layer three can be a low-pass filtered image sequence with finer scale details removed. Layer three may also be generated using other types of filters, such as edge-preserving smoothing filters that can remove textures while retaining sharp edges of image content. A layer may contain a number of image sequences, which can be channels.

Trajectories can be computed independently from the image sequences in each layer. Due to the differences from one layer to another, a trajectory of a given anchor pixel in one layer may not share the same space-time locations as a trajectory of the same anchor pixel in another layer. Such layer discrepancies provide valuable information that can be used for image enhancement. The correlations between the trajectories in different layers can be analyzed and used to refine the accuracy of the trajectories. In one example, the computation of trajectories and layer decompositions may be executed iteratively. Prior to layer decomposition, certain anchor points may be identified, and trajectories of those selected anchor points may be computed over the image sequence. The resulting trajectories may be used to guide layer decomposition and to generate more accurate layer trajectories.

After an image sequence is decomposed into layers, trajectories can be computed by tracking pixel image features. However, the pixel image features in a layer may appear dissimilar from one image frame to another image frame, and therefore may be difficult to track reliably and accurately. For example, the existence of noise in Layer two may make accurate tracking the fine scale details in the layer more difficult. Additional information may be needed to facilitate tracking of pixel image features in a specific layer, and a collection of such information can be decomposition features.

A decomposition feature may be a characteristic of the image content in a specific layer that is prominent within the layer and thus is easier to track. A decomposition feature is typically different from a pixel image feature. Returning to FIG. 2, the image processing device can determine decomposition features for the image frames in each layer in block 106. The decomposition features can be determined such that the decomposition features may be used to facilitate the computation of trajectories in a layer to account for dissimilarities of pixel image features. For example, if the fine-scale details in Layer two are corrupted by noise and become difficult to track, strong edges in the layer may be identified as decomposition features, which may be more likely to be tracked accurately even under noise corruption. An edge-detection method may be used to extract strong edges in Layer two, and the resulting strong edges may be used to facilitate trajectory computation in the layer.

The decomposition features may be computed from the same layer where the trajectories are to be computed, but the decomposition features may alternatively be computed from a different layer or from a number of different layers. For example, another type of decomposition features may be object masks. Object masks may be computed from another layer, such as Layer three in the above example, or the object masks may be obtained directly from the image sequence using a color segmentation method. Object masks may also be generated by a human-assisted interactive method, such as rotoscoping. Object masks may be used to facilitate trajectory computation in a specific layer, such as Layer two in the above example. The decomposition features may be added to a layer as additional feature channels. A layer with decomposition feature channels can be an augmented layer in which each image pixel is assigned an additional value from each feature channel. The feature channels of an augmented layer may include both decomposition features and the pixel image features. For example, Layer two may be an augmented layer with a pixel image feature channel containing fine-scale details and two added decomposition-feature channels including a strong edge channel and an object mask channel. Subsequently in the computation of trajectories in the layer, each trajectory may use some feature channels and determine whether those channels can be significantly modified. The selected feature channels may be as trajectory features. Trajectory features can be a subset of the feature channels in an augmented layer.

In block 108, the image processing device computes feature connections for image pixels in each layer based on the decomposed image features. A feature connection can be a link that connects an image pixel p from one space-time location $(x_p, y_p, t_p)$ to another space-time location $(x_t, y_t, t_t)$, where $t \approx p$. The image pixel p may have feature connections with a number of neighboring image frames. A feature connection can be computed based on the decomposition feature channels. In one example, preliminary feature connections of pixel p are first computed in a layer over a number of neighboring image frames using an optical flow method. The computation of optical flow can be based on a Bayesian approach that minimizes an energy function that includes data costs and link costs. The image pixels with the lowest energy values and those with the most reduced energy values can be selected as feature connections. In general, each image pixel in a layer may have feature connections with other frames in the same layer. In practice, however, only a limited number of feature connections may be selected to reduce the required computation. For example, pixel p $(x_p, y_p, t_p)$ may have four feature connections with the following space-time locations $(x_{p-2}, y_{p-2}, t_{p-2})$, $(x_{p-1}, y_{p-1}, t_{p-1})$, $(x_{p+1}, y_{p+1}, t_{p+1})$, $(x_{p+2}, y_{p+2}, t_{p+2})$ in four neighboring image frames.

In block 110, the image processing device calculates anchor trajectories for each layer based on select feature connections. Anchor trajectories can be computed based on selected feature connections in the layer using a sub-space method. A feature connection across M space-time locations in M frames may be represented by a 2M long column vector:

$$f_1 = [x_{t1}, y_{t1}, \ldots, x_{tM}, y_{tM}]^T \quad \text{(Equation 2)}$$

If N feature connections are selected, the column vectors are concatenated horizontally into a 2M×N matrix F $$F = [f_1, f_2, \ldots, f_M] \quad \text{(Equation 3)}$$

Each feature connection is represented as a separate column in the matrix. It assumes that all feature connections across those M frames exist in a rank R subspace, so that matrix F may be factorized into:

$$F = BC \quad \text{(Equation 4)}$$

B is a 2M×R matrix with each column representing a base trajectory, and C is a R×N matrix of coefficients. One example of computing the rank-R base matrix B is by applying singular value decomposition and truncation to rank R. Rank R can be related to the complexity of motion in the scene. Anchor trajectories are obtained from base matrix B after factorization since the R columns of matrix B are recognized as the intersections of anchor trajectories. In order to generate sufficient number of anchor trajectories, the value of M is sufficiently large since R<2M. In one example, multiple matrices $B_{tM \times B}$ may be computed by selecting multiple local areas in an image frame to generate a large number of anchor trajectories.

Each anchor trajectory may have a number of trajectory features, and those features can be selected from the feature channels from an augmented layer. The feature flags for each anchor trajectory can be set based on the characteristics of the layer decomposition as well as based on the targeted enhancement applications. The values of feature flags may be used as the control parameters for a given targeted enhancement application. For example, assuming anchor trajectories are defined as in the table of FIG. 1 for a three-layer decomposition where Layer one represents large-scale image details, Layer two represents fine-scale image details, and Layer three represents brightness distribution, the anchor trajectories in Layer one may have the feature flags for feature $f^1$ set to all "one's," indicating large-scale detail is the essential image component for the layer. At the same time, the feature flags for feature $f^2$ and feature $f^3$ may be set to all "zero's" so that both fine-scale detail and lighting changes are treated as outlying image components. Similarly, in Layer two, the feature flags for feature $f^2$ may be set to all "one's," while the flags for feature $f^1$ and $f^3$ may be set to all "zero's." If lighting change is prominent in the image sequence, the feature flags for $f^3$ may be set to all "one's" so that the process can be aware of lighting changes in the computation. The trajectory feature flags may be set differently for different layers.

The number of anchor trajectories can be smaller than the total number of image pixels in a layer because anchor trajectories are generated from a comparatively small number of selected image pixels. The feature connections of those selected pixels can be computed using methods such as optical flow. Anchor trajectories can be used to compute the feature connections for other image pixels that are not on the path of anchor trajectories. In block 112, the image processing device determines the relationships of each image pixel of the decomposed image frames with anchor trajectories in each layer. A relationship may be a feature association or a mathematical association in which there are similarities, differences, or similar differences between image pixels, trajectories, or image pixels and trajectories, etc. Relationships can be described in terms of space and time expressions or other mathematical expressions. Assuming pixel p is not on the path of any anchor trajectory, the feature connections of pixel p may be determined by establishing a relationship with one or more anchor trajectories in the neighborhood. An example of the relationships of pixel p with anchor trajectories are represented by Equation 5 in which its feature connection $f_p$ may be expressed as a sparse representation by anchor trajectories:

$$c_p = \arg\min \|c\|_0 \text{ subject to } f_p = Bc \quad \text{(Equation 5)}$$

In Equation 5, $\|c\|_0$ is a $L_0$ norm that equals the number of non-zero entries in coefficient vector c. Equation 5 may be computed using linear programming. The non-zero entries in the $L_0$ norm equals to the number of non-zero entries in the coefficient vector. The number of non-zero entries in $c_p$ implies that each image pixel may be related to a reduced number of anchor trajectories.

Blocks 108, 110, 112 may be applied to all decomposed layers for each pixel. For pixel p at space-time location ($x_p$, $y_p$, $t_p$) a set of information $\{B^l, c_p^l, f_p^l\}$, ($l \geq 1$) is computed in each layer l. As described previously, matrix $B^l$ stores the intersections of computed anchor trajectories, coefficient vector $c_p^l$ contains non-zero entries that represent the relationships between each pixel p with a reduced set of anchor trajectories, and feature connection $f_p^l$ represents preliminary feature connections for pixel p. Because different layers retain different characteristics of the image sequence and each layer uses different decomposition features, the anchor trajectories and the preliminary feature connections for pixel p may be different from one layer to another. For example, two different set of information may be computed from two different layers for the same pixel p: $\{B^1, c_p^1, f_p^1\}$ from Layer 1 that represents large-scale details and $\{B^2, c_p^2, f_p^2\}$ from Layer 2 that represents fine-scale details.

In block 114, the image processing device creates new trajectories for each image pixel of the decomposed image frames based on anchor trajectories and the relationships of the image pixel with anchor trajectories from at least two layers. New trajectories of any image pixel p may be computed based on the anchor trajectories and pixel relationships with the anchor trajectories from multiple layers. Anchor trajectories and pixel relationships may be different in different layers. Multi-layer trajectories can allow differences between layers to be explored so that a new trajectory may overcome dissimilarities of pixel image features. The differences among different layers may be unified so that new trajectories may be computed. A new trajectory for a pixel may be computed based on new anchor trajectories and relationships between the pixel and the new anchor trajectories from at least two layers. In a certain cases, multiple layers may share a common set of anchor trajectories, while in other cases different anchor trajectories may co-exist at different layers. In the above example of a two-layer decomposition where Layer one that represents large-scale details and Layer two that represents fine-scale details, two different sets of information—$\{B^1, c_p^1, f_p^1\}$ from Layer one and $\{B^2, c_p^2, f_p^2\}$ from Layer two—can be obtained. When a set of anchor trajectories in $B^1$ can be represented by a set of anchor trajectories in $B^2$, it is classified as a set of "shared" anchor trajectories. Otherwise it is classified as a set of "layer" anchor trajectories. Similar classifications are performed in $B^2$ and vice versa. When both $B^1$ and $B^2$ contain shared trajectories, a new set of anchor trajectories $\hat{B}$ may be computed from $B^1$ and $B^2$ by applying singular value decomposition and truncation. New anchor trajectories $\hat{B}^1$ in Layer one may be generated by merging $\hat{B}$ with the "layer" anchor trajectories in $B^1$. Similarly, new anchor trajectories $\hat{B}^2$ in Layer two may be generated by merging $\hat{B}$ with the "layer" anchor trajectories in $B^2$.

In the same example of a two-layer decomposition, pixel p may be classified as a "single trajectory pixel" if coefficient vector $c_p^1$ from Layer one and $c_p^2$ from Layer two only relate the pixel to "shared" anchor trajectories. Otherwise, pixel p can be classified as a "multiple trajectory pixel." For a "single trajectory pixel," a new preliminary connection $\hat{f}_p$ is computed by merging $f_p^1$ and $f_p^2$. A method of weighted averaging may be used to merge $f_p^1$ and $f_3^2$. A new coefficient vector may be calculated from the share anchor trajectory set $\hat{B}$ and $\hat{f}_p$ based on Equation 5. For a "multiple trajectory pixel", a new coefficient $\hat{c}_p^1$ may be computed based on $f_p^1$ and $B^1$ for Layer one, and another new coefficient $\hat{c}_p^2$ may be computed based on $f_p^2$ and $B^2$. Computing new trajectories may be extended to more than two layers.

In some implementations, new trajectories in a layer may also be generated by transferring anchor trajectories from another layer. In the example of a two-layer decomposition where pixel p is a multiple trajectory pixel, $B^2$ may be replaced by $B^1$. Similarly, $c_p^2$ may be replaced by $c_p^1$. As a result, the trajectory intersections of Layer two $f_p^2$ are effectively replaced by $f_p^1$ from Layer one. During the anchor trajectory transferring from Layer one to Layer two, the trajectory feature flags of Layer two, which represent fine-scale details, may be changed from "one's" to "zero's." This can indicate that fine-scale-detail features become the outlying image components and can be significantly modified. In general, pixels that are classified as multiple trajectory pixels usually relate to complex scene contents, such as transparency, water, clouds and chaotic scenes.

In block 116, the image processing device defines at least one trajectory feature for the new trajectories in each layer and determines if the trajectory features needs to be significantly modified at each new trajectory intersection in each layer. The new trajectories generated in block 114 may only include trajectory intersections $f_p^1$. Since a trajectory can also include trajectory features and trajectory feature flags, at least one new trajectory feature can be defined for the new trajectory in each layer. Similar to the generation of anchor trajectories as described previously, new trajectory features can be a subset of the feature channels of an augmented layer, selected for a targeted enhancement application. For example, for image detail enhancement application, the following three trajectory features may be selected for a new trajectory: feature $f^1$ may represent large-scale image details; feature $f^2$ may represent fine image details; and feature $f^3$ may represent lighting change between neighboring image frames. The device can determine whether trajectory features at each preliminary trajectory intersection in $f_p^1$ in each layer should be significantly modified.

The new trajectory intersections $f_p^1$ include space-time locations, and an analysis of the decomposition features in layers along the intersections may determine whether a location is "good" for the targeted enhancement application or otherwise. For a "good" location, at least one trajectory feature can be determined as an essential image component at the location. On the other hand, the trajectory feature may be treated as an outlying image component when the location is not a "good" one. In an example where the targeted enhancement application is the enhancement of image details, a motion analysis method can be applied to each space-time location based on decomposition features of a layer. Locations with a static or stable motion status may be considered "good" locations. Furthermore, the direction of motion at a space-time location may also provide an indication whether the location is a "good" for image details in certain directions. In another example where the input image sequence is already compressed, the compression parameters at different space-time locations may also provide an indication of image quality at each space-time locations. In another example, for pixels classified as "single trajectory pixels," the correlation between the decomposition features at different layers may be computed to determine if a location is associated with normal or abnormal lighting conditions.

A trajectory feature flag is set to "one" for a trajectory intersection where the corresponding trajectory feature is an essential image component, and it is set to "zero" when the corresponding feature flag is an outlying image component. In the example of a two-layer decomposition, the large scale feature flags of Layer one may be set to "one" for multiple trajectory pixels, while the fine-scale detail feature flags may be set to "zero" so that the fine-scale detail features may be significantly modified. This can be applicable for targeted applications such as detail enhancement. For other applications such as filling occlusion holes in VFX and film restorations, certain single trajectory pixels along the trajectory may have their large-scale feature flags also set to "zero," which indicates that those features can be significantly modified. The disclosed methods may be extended to various other targeted applications.

In block 118, the image processing device refines trajectory intersections by applying filtering to produce updated trajectory interjections and to modify the trajectory features in each layer. The precise trajectory intersections on the new trajectory where trajectory features are to be significantly modified can be determined. This may be achieved by filtering the relationships between the new trajectories and the anchor trajectories along the new trajectories to generate a refined trajectory. In practice, a prediction of the new trajectory intersection location p may be computed by $$\hat{f}_p^l = B^l c_p^l \quad \text{(Equation 6)}$$

$B^l$ is the new anchor trajectory set of layer l, and $c_p^l$ is the coefficient vector of layer l for pixel p. The predicted trajectory intersections at pixel p are related to the anchor trajectory by non-zero entries in the coefficient vector c, following Equation 6. The differences between $\tilde{f}_p^l$ and $f_p^l$ can be filtered using guided filtering, and the guidance used in filtering can be constructed based on decomposition features along $\tilde{f}_p^l$. The new trajectory intersections may be computed by:

$$\hat{f}_p^l = \hat{f}_p^l + S(f_p^l - \hat{f}_p^l) \quad \text{(Equation 7)}$$

S is a filtering process including a guided filtering process as described previously. The resulting new trajectory intersection $f_p^l$ can replace the preliminary intersection $f_p^l$ from block 114. Equation 7 can be used to refine the space-time locations of the new trajectory intersections where trajectory features have been determined to be significantly modified.

Once the trajectory intersection locations are determined, the trajectory feature flags at those locations may be changed accordingly. For the trajectory intersection locations where there is a significant difference between the final trajectory intersections $f_p^l$ and the preliminary trajectory intersections $f_p^l$, the trajectory feature flags may be set to "zero" so that the corresponding trajectory features may be modified. For each intersection location with "zero" feature flags, better features may be searched based on $f_p^l$.

The following is an example in connection with block 118 of a two-layer decomposition where Layer one represents large-scale details and Layer two represents fine-scale details. Depending on targeted enhancement applications, Layer 1 may be processed differently than Layer 2. First in Layer 1, the space-time locations with trajectory feature flags set to "one's" are collected and a prediction is generated by averaging the features of those locations along a trajectory. Then the predicted features may be adaptively blended with the features at the space-time locations with "zero" trajectory feature flags. The adaptive blending can use the correlations between different color channels. The result of Layer one can be used as a reference for the feature modifications in Layer two, under the assumption that the temporal behavior of Layer two is consistent with that of Layer one after the trajectory features are changed. Blocks 116 and 118 can be implemented iteratively, as represented by arrow 117, until highly accurate final trajectories are generated.

The final trajectories can be computed for each pixel of each image frame of the image sequence. In block 120, the image processing device outputs the final trajectories. The final trajectories in each layer may be outputted and saved for every pixel of every image frame of the image sequence, or for a subset of pixels and a subset of image frames. Multiple, final trajectories may be available for a pixel of an image frame in each layer, which can include a trajectory beginning from the pixel (in that case the pixel is called the anchor pixel of the trajectory), and trajectories starting from space-time locations in other frames and intersecting the image frame at the location of the pixel.

In block 122, the image processing device creates an enhanced image pixel in a layer by modifying pixel image features in each layer based on final trajectories. The trajectories passing through a pixel can be used to modify the pixel image features of that pixel. Specifically, the trajectories in each layer can be used to modify certain pixel image features in the layer, and the results of layer modifications from all layers can be combined to generate an enhanced image pixel.

An example of a process in block 122 includes one in which image detail enhancement is selected as the targeted enhancement application and a three-layer decomposition is used. Layer one represents large-scale image details, Layer two represents fine-scale image details, and Layer 3 represents brightness distribution. After new trajectories are generated for pixels in the three layers of the image frames, a detail-preserving, smoothing process can be applied to each pixel in Layer one and Layer two of an image frame based on the trajectory features of each trajectory that passes each pixel. The detail-preserving, smoothing process can be confined by the space-time locations of each trajectory that passes the pixel. A different set of parameters may be selected for the detail-preserving, smoothing processing in Layer one than those selected for the detail-preserving, smoothing processing in Layer two. The processing in Layer three may need special consideration since the brightness layer usually includes complex visual effects and confounding cases such as cloud and smoke. Detail-preserving and smoothing may also be applied to Layer three, but it is applied adaptively based on whether the space-time location along a trajectory is classified as "single trajectory pixel" or "multiple trajectory pixel."

In block 124, the image processing device creates an enhanced image sequence using the enhanced decomposed image layers. After the image pixels of the image frames are enhanced in the layers based on new trajectories, an inverse transform can be applied to each enhanced image frames to produce an enhanced image sequence. Certain constraints may be applied prior to the inverse transform so that the changes to the images may be confined within a controllable range. In block 126, the image processing device can output the enhanced image sequence. The enhanced image sequence may be outputted through an output device or stored in a form of image data.

Figure 4:
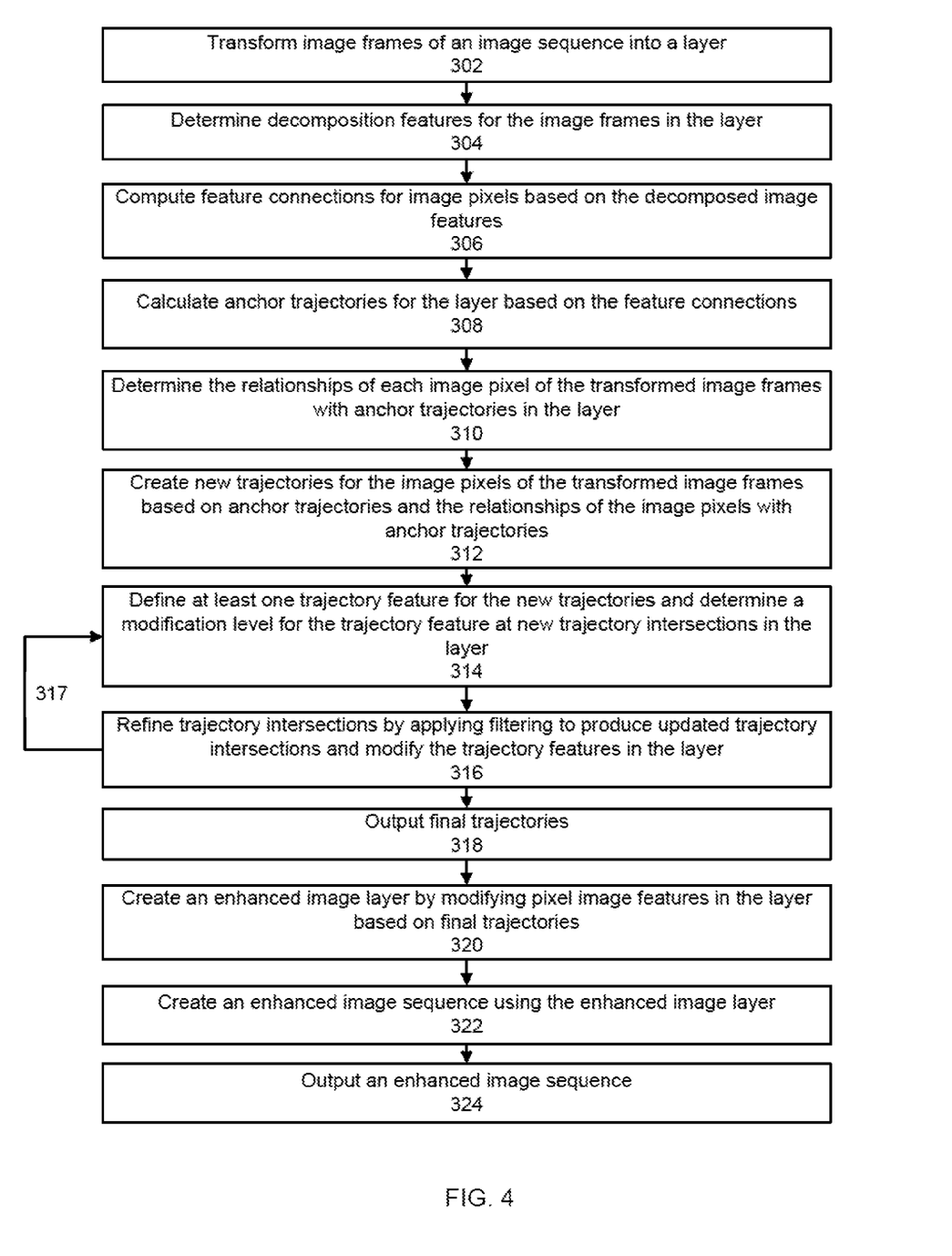
FIG. 4 is a block diagram of a method of enhancing an image sequence by computing trajectories according to one example.

The methods described in FIG. 2 may be simplified for some applications in which layer composition may not be applicable due to computational cost restrictions. In such cases, an image sequence can be treated as a single layer by transforming the image sequence into a single layer, and the computation of trajectories may be applied to the transformed single layer without creating multiple layers as in layer decomposition. One way the image sequence can be transformed is by a Fourier transform to create the transformed single layer. The transformed single layer can have the same or fewer number of pixels as the original image sequence. FIG. 4 depicts an example of generating an enhanced image sequence without decomposition into multiple layers.

In block 302, the image processing device transforms image frames of an image sequence into a layer. In block 304, the image processing device determines decomposition features for the image frames in the layer. A decomposition feature may be a characteristic of the image content in a specific layer that is prominent within the layer. In block 306, the image processing device computes feature connections for image pixels based on the decomposed image features. A feature connection may be a link that connects an image pixel from one space-time location to another space-time location. In block 308, the image processing device calculates anchor trajectories for the layer based on the feature connections. An anchor trajectory may be space-time locations of a selected image content element over the length of the image sequence, and the features of the selected image content element in the vicinity of each space-time location in a form of multiple feature channels.

In block 310, the image processing device determines the relationships of each image pixel of the transformed image frames with anchor trajectories in the layer. In block 312, the image processing device creates new trajectories for the image pixels of the transformed image frames based on anchor trajectories and the relationships of the image pixels with anchor trajectories. In block 314, the image processing device defines at least one trajectory feature for the new trajectories and determines a modification level for the trajectory feature at new trajectory intersections in the layer. In block 316, the image processing device refines trajectory intersections by applying filtering to the trajectory intersections to produce updated trajectory intersections and modifies the trajectory features in the layer. Blocks 314 and 316 can be performed iteratively, as represented by arrow 317 until final trajectories are generated. In other implementations, block 316 is not performed and the iterative process represented by arrow 317 is not performed.

In block 318, the image processing device outputs final trajectories. In block 320, the image processing device creates an enhanced image pixel in the layer by modifying pixel image features in the layer based on final trajectories. In block 322, the image processing device creates an enhanced image sequence using the enhanced image layer. In block 324, the image processing device outputs the enhanced image sequence.

Multilayer decomposition may be better suited for feature movie sequences in which image sequences include image sequences from multiple cameras of special VFX. The nature of the artifacts in image sequences captured by multiple cameras can be more complex and involve multilayer decomposition for effective image enhancement. Image sequence content captured by one imaging device, such as one camera, may not require multilayer decomposition because the nature of the artifacts is not as varied.

Certain embodiments of the digital enhancement of an input image sequence and output of an enhanced image sequence are implemented in a hardware computing device connected to an image display system through an external connection. The computing performed in the hardware computing device can be achieved using a computer programmed to perform various methods according to various examples with high-performing, graphics-processing unit (GPU) cards. Such a configuration may allow computing tasks to be implemented in software, such as in OpenGL GLSL, Cg or CUDA, taking advantage of the computational power of the GPU. For example, a computer program product can be disposed onto one or more hardwire devices, such as those described above or other devices such as a computer system or server. The computer program product may include executable code stored on a computer-readable memory that, when executed, can cause the hardwire devices to perform various methods according to various embodiments of the present invention. Using GPU may reduce the cost for the development of an embedded device and may provide flexibility for future feature upgrades. The enhanced image sequence data produced by the hardware computing device or software can be displayed directly on the image display system through the external connection.

Figure 5:
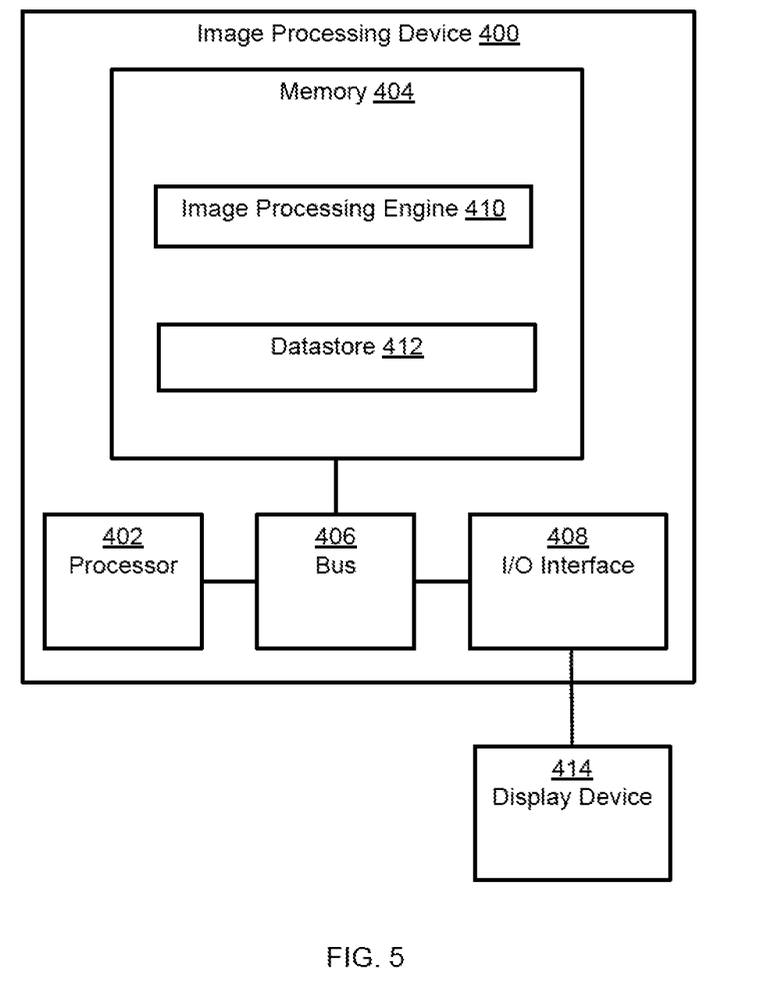
FIG. 5 is a block diagram of an image processing device according to one example.

FIG. 5 depicts a block diagram with an example of the image processing device 400. Other examples may of course be utilized. The image processing device 400 includes a processor 402, a memory 404, and a bus 406. The memory 404 includes a computer-readable memory device on which code is stored. The processor 402 can execute code stored in the memory 404 by communication via the bus 406 to cause the image processing device 400 to perform actions. The image processing device 400 can include an input/output (I/O) interface 408 for communication with other components, such as a display device 414. The image processing device 400 may be any device that can process data and execute code that is a set of instructions to perform actions. Examples of the image processing device 400 include a database server, a web server, desktop personal computer, a laptop personal computer, a handheld computing device, and a mobile device.

Examples of the processor 402 include a microprocessor, an application-specific integrated circuit (ASIC), a state machine, or other suitable processor. The processor 402 may include one processor or any number of processors. The processor 402 can access code stored in the memory 404 via the bus 406. The memory 404 may be any non-transitory computer-readable medium configured for tangibly embodying code and can include electronic, magnetic, or optical devices. Examples of the memory 404 include random access memory (RAM), read-only memory (ROM), a floppy disk, compact disc, digital video device, magnetic disk, an ASIC, a configured processor, or other storage device.

Instructions can be stored in the memory 404 as executable code. The instructions can include processor-specific instructions generated by a compiler or an interpreter from code written in any suitable computer-programming language. The instructions can include an application, such as an image processing engine 410, that, when executed by the processor 402, can cause the image processing device 400 to perform actions, such as those described in connection with FIGS. 2-4. The image processing device 400 may also include a GPU. The memory 404 can also include a datastore 412 in which content and data can be stored. Certain aspects can be implemented in a projector system, such as a projector system that includes the image processing device 400.

The foregoing is provided for purposes of illustrating, explaining, and describing embodiments of the present invention. Further modifications and adaptations to these embodiments will be apparent to those skilled in the art and may be made without departing from the scope or spirit of the invention.

What is claimed is:

1. A method to enhance an image sequence, the method comprising:
   receiving the image sequence with image frames;
   determining a decomposition feature for the image frames;
   computing feature connections for image pixels based on the decomposition feature;
   calculating at least one anchor trajectory based on at least one selected feature connection among the feature connections;
   determining a relationship of an image pixel with the at least one anchor trajectory;
   creating a new trajectory for an image pixel of decomposed image frames based on the at least one anchor trajectory and the relationship of the image pixel with the at least one anchor trajectory;
   defining at least one trajectory feature for the new trajectory and determining whether the at least one trajectory feature needs to be modified at a new trajectory intersection;
   refining the new trajectory intersection and producing a final trajectory;
   creating an enhanced image pixel by modifying a pixel image feature based on the final trajectory;
   creating an enhanced image sequence based on the enhanced image pixel; and
   outputting the enhanced image sequence.

2. The method of claim 1, further comprising determining the at least one trajectory feature for the new trajectory intersection along the new trajectory is an essential image component or an outlying image component for a targeted enhancement application.

3. The method of claim 1, further comprising determining by analysis whether the at least one trajectory feature of the new trajectory intersection is an essential image component or an outlying image component based on a characteristic of a layer decomposition and a targeted enhancement application.

4. The method of claim 3, further comprising:
   analyzing a correlation between trajectories in a layer, the layer including the decomposed image frames of the image sequence; and
   computing the trajectories and the layer decomposition iteratively to refine layer trajectory accuracy.

5. The method of claim 1, wherein determining the decomposition feature is based on a targeted enhancement application.

6. The method of claim 5, further comprising:
   identifying the pixel image feature in the image sequence based on the targeted enhancement application;
   extracting an identified pixel image feature from the image sequence;
   processing an extracted pixel image feature to further characterize the pixel image feature; and
   organize a characterized pixel image feature to form at least two layers.

7. The method of claim 1, further comprising filtering the relationship between the new trajectory and the at least one anchor trajectory along the new trajectory intersection to generate an updated trajectory.

8. The method of claim 1, wherein creating the enhanced image sequence includes using the image sequence with the enhanced image pixel.

9. The method of claim 1, wherein calculating the at least one anchor trajectory is based only on the at least one selected feature connection for an image frame of the image sequence.

10. The method of claim 1, wherein refining the new trajectory intersection includes filtering the relationship of at least one image pixel along the new trajectory.

11. The method of claim 1, wherein the at least one anchor trajectory is a path connection that records a space-time location of a same image content element over a length of the image sequence for a selected image pixel,
   wherein the new trajectory intersection is representative of the space-time location of the new trajectory and an image frame,
   wherein the feature connections includes links that connect the image pixels from space-time locations to other space-time locations,
   wherein the at least one trajectory feature represents a characteristic of the image sequence that is selected for a targeted enhancement application.

12. A method to enhance an image sequence, comprising:
   receiving the image sequence with image frames;
   decomposing the image sequence into at least two layers that form decomposed image frames;
   determining a decomposition feature for the image frames in a layer;
   computing feature connections for image pixels in the layer based on the decomposition feature;
   calculating at least one anchor trajectory for the layer based on at least one selected feature connection;
   determining a relationship of an image pixel of the image frames with the at least one anchor trajectory in each of the at least two layers;
   creating a new trajectory for the image pixel or another image pixel of the decomposed image frames based on the at least one anchor trajectory and the relationship of the image pixel with the at least one anchor trajectory from the at least two layers;
   defining at least one trajectory feature for the new trajectory in the layer and determining if the at least one trajectory feature needs to be modified at a new trajectory intersection in the layer;
   refining the new trajectory intersection and producing a final trajectory;
   creating an enhanced image pixel in at least one layer by modifying image pixel features in each of the at least two layers based on the final trajectory;
   creating an enhanced image sequence based on the enhanced image pixel in decomposed image layers; and
   outputting the enhanced image sequence.

13. The method of claim 12, further comprising determining the at least one trajectory feature for the new trajectory intersection along the new trajectory is an essential image component or an outlying image component for a targeted enhancement application.

14. The method of claim 12, wherein determining the decomposition feature is based on a targeted enhancement application.

15. The method of claim 14, further comprising:
   identifying a pixel image feature in the image sequence based on the targeted enhancement application;
   extracting an identified pixel image feature from the image sequence;
   processing an extracted pixel image feature to further characterize the pixel image feature; and
   organize a characterized pixel image feature to form the at least two layers.

16. The method of claim 12, further comprising filtering the relationship between the new trajectory and the at least one anchor trajectory along the new trajectory intersection to generate an updated trajectory.

17. The method of claim 12, wherein refining the new trajectory intersection includes filtering the relationship of the image pixel along the new trajectory.

18. The method of claim 12, wherein the at least one anchor trajectory is a path connection that records a space-time location of a same image content element over a length of the image sequence for a selected image pixel,
wherein the new trajectory intersection is representative of the space-time location of the new trajectory and an image frame,
wherein the feature connections include links that connect the image pixels from space-time locations to other space-time locations,
wherein the at least one trajectory feature represents a characteristic of the image sequence that is selected for a targeted enhancement application.

19. The method of claim 12, wherein the new trajectory is based on the at least one anchor trajectory that is transferred from another layer.

20. A method, comprising:
generating at least one image processing layer from image frames of an image sequence;
determining decomposition features that are characteristics of image content in the at least one image processing layer for the image frames;
determining feature connections based on the decomposition features, the feature connections including links that connect image pixels in the at least one image processing layer among space-time locations;
calculating anchor trajectories for the at least one image processing layer based on the feature connections, the anchor trajectories representing space-time locations of selected image content elements over a length of the image sequence;
determining relationships of the image pixels with the anchor trajectories;
generating new trajectories for the image pixels based on the relationships and the anchor trajectories;
defining a trajectory feature for the new trajectories and determining a modification level for the trajectory feature at new trajectory intersections in the at least one image processing layer, the trajectory feature representing characteristics selected for targeted enhancement in the image sequence, the new trajectory intersections recording intersections of the new trajectories with the image frames in a form of space-time locations;
generating final trajectories from the new trajectories;
generating at least one enhanced image layer by modifying pixel image features in the at least one image processing layer based on the final trajectories; and
generating an enhanced image sequence using the at least one enhanced image layer.

21. The method of claim 20, wherein generating the final trajectories from the new trajectories includes refining the new trajectory intersections by applying filtering to produce updated trajectory intersections and modifying the trajectory feature.

22. The method of claim 20, wherein defining the trajectory feature and refining the new trajectory intersections are performed iteratively.

23. The method of claim 20, wherein the at least one image processing layer includes a plurality of image processing layers.

24. The method of claim 20, further comprising determining by analysis whether the trajectory feature is an essential image component or an outlying image component based on a characteristic of a layer decomposition and a targeted enhancement application.

25. The method of claim 20, further comprising:
analyzing a correlation between trajectories in the at least one image processing layer; and
computing the trajectories and layer decomposition iteratively to refine layer trajectory accuracy.

26. The method of claim 20, further comprising:
identifying the pixel image features in the image sequence based on a targeted enhancement application;
extracting an identified pixel image feature from the image sequence;
processing an extracted pixel image feature to further characterize the pixel image features; and
organize a characterized pixel image feature to form at least two image processing layers.

27. A non-transitory computer-readable medium having instructions stored thereon that are executable by a processor device to perform operations, the operations comprising:
generating at least one image processing layer from image frames of an image sequence;
determining decomposition features that are characteristics of image content in the at least one image processing layer for the image frames;
determining feature connections based on the decomposition features, the feature connections including links that connect image pixels in the at least one image processing layer among space-time locations;
calculating anchor trajectories for the at least one image processing layer based on the feature connections, the anchor trajectories representing space-time locations of selected image content elements over a length of the image sequence;
determining relationships of the image pixels with the anchor trajectories;
generating new trajectories for the image pixels based on the relationships and the anchor trajectories;
defining a trajectory feature for the new trajectories and determining a modification level for the trajectory feature at new trajectory intersections in the at least one image processing layer, the trajectory feature representing characteristics selected for targeted enhancement in the image sequence, the new trajectory intersections recording intersections of the new trajectories with the image frames in a form of space-time locations;
generating final trajectories from the new trajectories;
generating at least one enhanced image layer by modifying pixel image features in the at least one image processing layer based on the final trajectories; and
generating an enhanced image sequence using the at least one enhanced image layer.

28. The non-transitory computer-readable medium of claim 27, wherein the non-transitory computer-readable medium is disposed in an image processing device.

29. The non-transitory computer-readable medium of claim 27, wherein the operations of generating the final trajectories from the new trajectories includes refining the new trajectory intersections by applying filtering to produce updated trajectory intersections and modifying the trajectory feature.

30. The non-transitory computer-readable medium of claim 27, wherein the operations of defining the trajectory feature and refining the new trajectory intersections are performed iteratively.

31. The non-transitory computer-readable medium of claim 27, wherein the at least one image processing layer includes a plurality of image processing layers.

32. The non-transitory computer-readable medium of claim 27, wherein the operations further comprise determining by analysis whether the trajectory feature is an essential image component or an outlying image component based on a characteristic of a layer decomposition and a targeted enhancement application.

33. The non-transitory computer-readable medium of claim 27, wherein the operations further comprise:
  analyzing a correlation between trajectories in the at least one image processing layer; and
  computing the trajectories and layer decomposition iteratively to refine layer trajectory accuracy.

34. The non-transitory computer-readable medium of claim 27, wherein the operations further comprise:
  identifying the pixel image features in the image sequence based on a targeted enhancement application;
  extracting an identified pixel image feature from the image sequence;
  processing an extracted pixel image feature to further characterize the pixel image features; and
  organize a characterized pixel image feature to form at least two image processing layers.

* * * * *